(12) United States Patent
Liu et al.

(10) Patent No.: US 12,423,776 B2
(45) Date of Patent: Sep. 23, 2025

(54) METHOD, ELECTRONIC DEVICE, AND COMPUTER PROGRAM PRODUCT FOR IMAGE PROCESSING UTILIZING ENCODER-DECODER ARRANGEMENT

(71) Applicant: Dell Products L.P., Round Rock, TX (US)

(72) Inventors: Zhisong Liu, Shenzhen (CN); Zijia Wang, WeiFang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 471 days.

(21) Appl. No.: 17/993,328

(22) Filed: Nov. 23, 2022

(65) Prior Publication Data

US 2024/0185388 A1   Jun. 6, 2024

(30) Foreign Application Priority Data

Oct. 20, 2022   (CN) .......................... 202211288516.1

(51) Int. Cl.
*G06T 5/00* (2024.01)
*G06T 3/40* (2006.01)
(Continued)

(52) U.S. Cl.
CPC ................. *G06T 5/50* (2013.01); *G06T 3/40* (2013.01); *G06V 10/751* (2022.01); *G06V 10/7715* (2022.01); *G06T 2207/20016* (2013.01)

(58) Field of Classification Search
CPC ....... G06T 3/4053; G06T 5/50; G06T 3/4046; G06T 3/4076; G06T 9/00; G06N 3/045;
(Continued)

(56) References Cited

U.S. PATENT DOCUMENTS

2021/0104019 A1*   4/2021   Chujoh ................. G06T 3/4053

FOREIGN PATENT DOCUMENTS

| CN | 112598575 A | * | 4/2021 | |
|---|---|---|---|---|
| CN | 114466192 A | * | 5/2022 | ............. G06N 3/045 |
| CN | 114897694 A | * | 8/2022 | ........... G06T 3/4053 |

OTHER PUBLICATIONS

Liu, Zhi-Song, Wan-Chi Siu, and Li-Wen Wang. "Variational autoencoder for reference based image super-resolution." Proceedings of the IEEE/CVF conference on computer vision and pattern recognition. 2021. (Jun. 20, 2021 to Jun. 25, 2021 Nashville, TN, USA).*

(Continued)

*Primary Examiner* — Li Liu
(74) *Attorney, Agent, or Firm* — Ryan, Mason & Lewis, LLP

(57) ABSTRACT

A method in one embodiment includes: extracting first image features of a first image of a first resolution and second image features of a second image of a second resolution, wherein the first resolution is less than the second resolution, and the first image and the second image correspond to each other. The method further includes: extracting reference image features of a reference image, wherein the reference image includes edges and modes for reconstruction reference. The method further includes: generating a third image of a third resolution based on the first image features, the second image features, and the reference image features, wherein the third resolution is less than or equal to the second resolution. By using this method, super-resolution image processing can be implemented on a low-resolution image to obtain a reconstructed image with similar or the same resolution as the original image, with reduced storage space and device costs.

20 Claims, 7 Drawing Sheets

(51) Int. Cl.
*G06T 5/50* (2006.01)
*G06V 10/75* (2022.01)
*G06V 10/77* (2022.01)

(58) Field of Classification Search
CPC .... G06N 3/08; G06V 10/751; G06V 10/7715; G06F 18/22; G06F 18/253
See application file for complete search history.

(56) References Cited

OTHER PUBLICATIONS

Yang, Cheng, and Guanming Lu. "Deeply recursive low-and high-frequency fusing networks for single image super-resolution." Sensors 20.24 (2020): 7268.*

C. Dong et al., "Image Super-Resolution Using Deep Convolutional Networks," IEEE Transactions on Pattern Analysis and Machine Intelligence, arXiv:1501.00092v3, Jul. 31, 2015, 14 pages.

J. Kim et al., "Accurate Image Super-Resolution Using Very Deep Convolutional Networks," IEEE Conference on Computer Vision and Pattern Recognition (CVPR), arXiv:1511.04587v2, Nov. 11, 2016, 9 pages.

W.-S. Lai et al., "Deep Laplacian Pyramid Networks for Fast and Accurate Super-Resolution," IEEE Conference on Computer Vision and Pattern Recognition (CVPR), arXiv:1704.03915v2, Oct. 9, 2017, 9 pages.

C. Ledig et al., "Photo-Realistic Single Image Super-Resolution Using a Generative Adversarial Network," IEEE Conference on Computer Vision and Pattern Recognition (CVPR), arXiv:1609.04802v5, May 25, 2017, 19 pages.

B. Lim et al., "Enhanced Deep Residual Networks for Single Image Super-Resolution," IEEE Conference on Computer Vision and Pattern Recognition (CVPR), arXiv:1707.02921v1, Jul. 10, 2017, 9 pages.

Y. Zhang et al., "Image Super-Resolution Using Very Deep Residual Channel Attention Networks," European Conference on Computer Vision, arXiv:1807.02758v2, Jul. 12, 2018, 16 pages.

Y. Zhang et al., "Residual Dense Network for Image Super-Resolution," IEEE/CVF Conference on Computer Vision and Pattern Recognition, arXiv:1802.08797v2, Mar. 27, 2018, 10 pages.

M. Haris et al., "Deep Back-Projection Networks for Single Image Super-resolution," IEEE Transactions on Pattern Analysis and Machine Intelligence, arXiv:1904.05677v2, Jun. 13, 2020, 14 pages.

Z.-S. Liu et al., "Hierarchical Back Projection Network for Image Super-Resolution," IEEE/CVF Conference on Computer Vision and Pattern Recognition, arXiv:1906.06874v2, Jun. 20, 2019, 10 pages.

Z.-S. Liu et al., "Image Super-Resolution via Attention based Back Projection Networks," IEEE/CVF Conference on Computer Vision and Pattern Recognition, arXiv:1910.04476v, Oct. 10, 2019, 9 pages.

T. Dai et al., "Second-order Attention Network for Single Image Super-Resolution," Proceedings of the IEEE Conference on Computer Vision and Pattern Recognition, Jun. 1, 2019, 10 pages.

B. Niu et al., "Single Image Super-Resolution via a Holistic Attention Network," European Conference on Computer Vision, arXiv:2008.08767v1, Aug. 20, 2020, 16 pages.

I. J. Goodfellow et al., "Generative Adversarial Nets," Advances in Neural Information Processing Systems, arXiv:1406.2661v1, Jun. 10, 2014, 9 pages.

Z.-S. Liu et al., "Reference Based Face Super-Resolution," IEEE Access, vol. 7, Sep. 23, 2019, pp. 129112-129126.

J. Engel et al., "Latent Constraints: Learning to Generate Conditionally from Unconditional Generative Models," arXiv:1711.05772v2, Dec. 21, 2017, 22 pages.

Z.-S. Liu et al., "Unsupervised Real Image Super-Resolution via Generative Variational AutoEncoder," IEEE International Conference on Computer Vision and Pattern Recognition Workshop, arXiv:2004.12811v1, Apr. 27, 2020, 10 pages.

Z.-S. Liu et al., "Photo-Realistic Image Super-Resolution via Variational Autoencoders," IEEE Transactions on Circuits and Systems for Video Technology, vol. 31, No. 4, Apr. 2021, 15 pages.

* cited by examiner 401 402 403 404

METHOD, ELECTRONIC DEVICE, AND COMPUTER PROGRAM PRODUCT FOR IMAGE PROCESSING UTILIZING ENCODER-DECODER ARRANGEMENT

RELATED APPLICATION

The present application claims priority to Chinese Patent Application No. 202211288516.1, filed Oct. 20, 2022, and entitled "Method, Electronic Device, and Computer Program Product for Image Processing," which is incorporated by reference herein in its entirety.

FIELD

Embodiments of the present disclosure relate to the field of computers, and more particularly, to a method, an electronic device, and a computer program product for image processing.

BACKGROUND

Image/video super-resolution (SR) is a fundamental signal processing technique in computer vision. It is a cornerstone of digitization and communication. Its goal is to compress rich spatial/temporal information into a denser space without loss of the original quality. Given that human beings now live in an era of big data, the amount of data is growing exponentially, especially in cases where there are more high-definition devices available. For example, users may need to store their 4K images and videos in the cloud for remote access. Enterprises and digital service providers can offer customized cloud services to enable efficient data sharing. For enterprises, their need for artificial intelligence training and data analysis on big data is even more urgent. By providing easy access to high-quality big data, artificial intelligence companies or research groups are allowed to directly access the data without downloading.

Image super-resolution has also been a long-standing research topic. Most current techniques focus more on low-resolution upsampling, such as providing only low magnifications of 2× and 4×. For images with 4K or 8K resolution, it is not sufficient to only provide upsampling functions with 2×, 4×magnifications.

SUMMARY

Embodiments of the present disclosure provide a method, an electronic device, and a computer program product for image super-resolution reconstruction.

According to a first aspect of the present disclosure, a method for image processing is provided. The method includes: extracting first image features of a first image of a first resolution and second image features of a second image of a second resolution, wherein the first resolution is less than the second resolution, and the first image and the second image correspond to each other. The method further includes: extracting reference image features of a reference image, wherein the reference image includes edges and modes for reconstruction reference. generating a third image of a third resolution based on the first image features, the second image features, and the reference image features, wherein the third resolution is less than or equal to the second resolution.

According to a second aspect of the present disclosure, an electronic device is provided. The electronic device includes at least one processor; and a memory coupled to the at least one processor and having instructions stored therein, wherein the instructions, when executed by the at least one processor, cause the electronic device to perform actions comprising: extracting first image features of a first image of a first resolution and second image features of a second image of a second resolution, wherein the first resolution is less than the second resolution, and the first image and the second image correspond to each other. The actions further include: extracting reference image features of a reference image, wherein the reference image comprises edges and modes for reconstruction reference; and generating a third image of a third resolution based on the first image features, the second image features, and the reference image features, wherein the third resolution is less than or equal to the second resolution.

According to a third aspect of the present disclosure, a computer program product is provided, which is tangibly stored on a non-transitory computer-readable medium and includes machine-executable instructions, wherein the machine-executable instructions, when executed by a machine, cause the machine to perform steps of the method in the first aspect of the present disclosure.

BRIEF DESCRIPTION OF THE DRAWINGS

By description of example embodiments of the present disclosure, provided in more detail herein in connection with the accompanying drawings, the above and other objectives, features, and advantages of the present disclosure will become more apparent, wherein in the example embodiments of the present disclosure, the same reference numerals generally represent the same elements. In the accompanying drawings.

DETAILED DESCRIPTION

Illustrative embodiments of the present disclosure will be described in more detail below with reference to the accompanying drawings. While some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

Currently known techniques focus more on low-resolution upsampling of images, such as providing only upsampling of low magnifications of 2× and 4×. Current techniques are unable to reconstruct maps with 4K or 8K resolution. In addition, current techniques are unable to reconstruct finer and high-definition details, such as image edges and textures, hair details, and the like.

At least to address the above and other potential problems, embodiments of the present disclosure provide a method for image processing. The method includes: extracting low-resolution image features of a low-resolution image of a low resolution and original image features of an original image of an original resolution, wherein the low resolution is less than the original resolution, and the low-resolution image and the original image correspond to each other. The method further includes: extracting reference image features of a reference image, wherein the reference image includes edges and modes for reconstruction reference; and generating a reconstructed image of a reconstruction resolution based on the low-resolution image features, the original image features, and the reference image features, wherein the reconstruction resolution is less than or equal to the original resolution. By using this method, super-resolution image processing can be implemented on a low-resolution image to obtain a reconstructed image with similar or the same resolution as the original image, thereby saving a large amount of storage space and device costs while providing superior image recovery quality.

Figure 1:
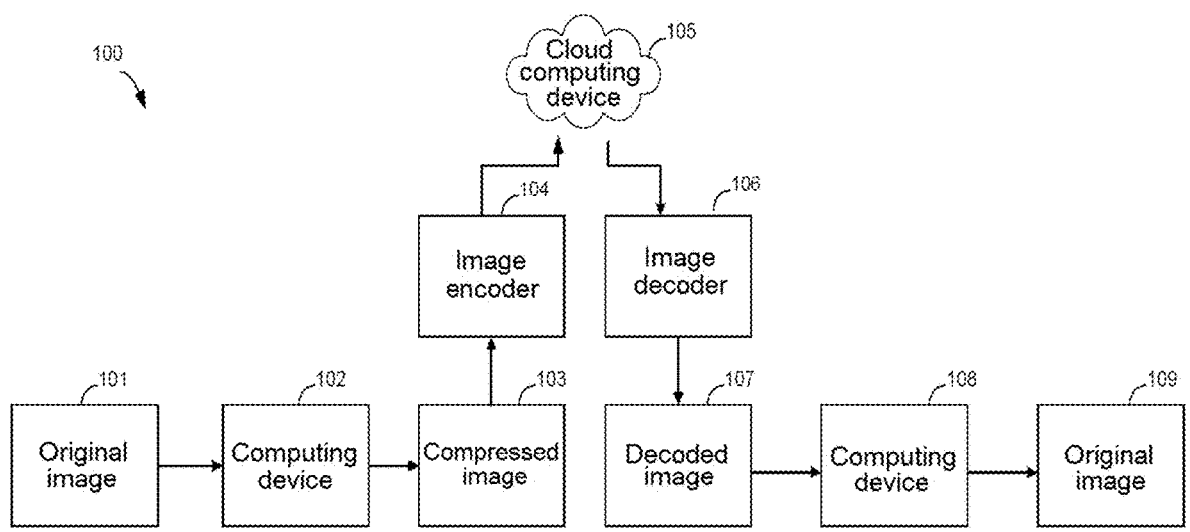
FIG. 1 illustrates a schematic diagram of an example environment in which a device and/or a method according to embodiments of the present disclosure can be implemented.

Fundamental principles and a plurality of example embodiments of the present disclosure will be described in detail below with reference to the accompanying drawings. FIG. 1 illustrates a schematic diagram of example environment 100 in which a device and/or a method according to embodiments of the present disclosure can be implemented. It should be understood that the numbers, the arrangement, and the data transmission process of the devices, images, encoders, and decoders illustrated in FIG. 1 are only examples, and that example environment 100 may include different numbers of devices, images, encoders, and decoders that are arranged in different manners, as well as various additional elements, etc.

FIG. 1 illustrates example environment 100 that includes original images 101 and 109, computing devices 102 and 108, compressed image 103, decoded image 107, image encoder 104, image decoder 106, and cloud computing device 105. In this example environment 100, the present disclosure designs a novel GAN-like variational autoencoder architecture framework, which may be referred to as Soft-Intro VAE. It may use image encoder 104 and image decoder 106 to form an adversarial structure to explore the underlying data distribution. It also uses the prior knowledge from the reference image to provide rich modes for fine details reconstruction. In this example environment 100, computing devices 102 and 108 may be any devices with processing computing resources or storage resources. For example, computing device 102 may have common capabilities of receiving and sending data requests, real-time data analysis, local data storage, real-time network connectivity, and the like. The computing devices may typically include various types of devices. Examples of the computing devices may include, but are not limited to: desktop computers, laptop computers, smartphones, wearable devices, security devices, smart manufacturing devices, smart home devices, Internet of Things devices, smart cars, drones, and the like. It should be understood that although only computing device 102 and computing device 108 are illustrated in FIG. 1, this is merely an example and not a specific limitation of the present disclosure. In example environment 100, any number and any type of devices may be included. Also, although illustratively shown as being separate from respective computing device 102 and computing device 108 in FIG. 1, image encoder 104 and image decoder 106 may instead be incorporated in or otherwise associated with respective computing device 102 and computing device 108.

In this example environment 100, original image 101 may include one or more images having any resolution, any content, any format type, and any number, and the present disclosure is not limited in this regard. For example, original image 101 may have different resolutions, such as 720P, 1080P, 4K, 8K, etc., and the present disclosure does not limit the content of the image. Original image 101 may include images stored in computing device 102 for a user, and may also include images captured in real time by the user through an image capture device (such as a camera) of computing device 102, and the present disclosure does not limit the source of images, the way in which they are acquired, the content of the images, and other aspects.

The user may first acquire compressed image 103 by compressing original image 101 with computing device 102. Compressed image 103 may be compressed at any compression rate relative to original image 101. For example, computing device 102 may compress original image 101 at a compression rate of 10%, 30%, 50%, etc. to acquire compressed image 103. Computing device 102 having image encoder 104 may subsequently encode compressed image 103 to acquire encoded data, where image encoder 104 has already been trained based on the method for image processing implemented in the present disclosure. Additionally or alternatively, compressed image 103 may be further compressed by image encoder 104 at any compression rate. For example, compressed image 103 may be further compressed by image encoder 104 at a compression rate of 10%, 30%, 50%, etc. to acquire the compressed encoded data.

The user may then transmit the acquired encoded data over a network by computing device 102 to cloud computing device 105 implemented according to the method for image processing of the present disclosure. The network may include, but is not limited to, various types of networks such as the Internet, a local area network, and a wireless network, and the present disclosure is not limited in this regard. Cloud computing device 105 may be a shared pool of configurable computing resources (including but not limited to servers, processing, computing, storage, etc.) that can be easily accessed over the network. The type of services that may be provided by cloud computing device 105 includes, but is not limited to, infrastructure as a service (IaaS), platform as a service (PaaS), and software as a service (SaaS), and the present disclosure is not limited in this regard. Cloud computing device 105 may further be deployed as a private cloud, a community cloud, and a hybrid cloud, among others, and the present disclosure is not limited in this regard. Cloud computing device 105 may also have the characteristics of providing computing power according to user needs and being compatible with different software or hardware, and the like. Additionally or alternatively, any localized architecture may be used to implement cloud computing device 105.

In response to receiving a request from the user, cloud computing device 105 may transmit the encoded data to computing device 108 having image decoder 106, where image decoder 106 has been trained based on the method for image processing implemented in the present disclosure. In response to receiving the encoded data, the image decoder generates decoded image 107 by decoding the encoded data. In response to receiving decoded image 107, computing device 108 decompresses decoded image 107 to obtain another original image 109 that is the same as original image 101.

It should be understood that although computing device 102 and computing device 108 are illustrated in FIG. 1 as different computing devices, this is merely an example and not a specific limitation of the present disclosure. Depending on the practical application, the computing device may be any number of computing devices from any user. For example, computing device 102 and computing device 108 may be the same device from the same user, computing device 102 and computing device 108 may also be different devices from different users, or computing device 102 and computing device 108 may also be different devices from the same user, and the present disclosure is not limited in this regard. In addition, it should also be understood that although image encoder 104 and image decoder 106 in example environment 100 are described as being associated with computing device 102 and computing device 108, respectively, this is only an example. Depending on the practical application, image encoder 104 and image decoder 106 may be located on any identical or different computing devices, respectively, and the present disclosure is not limited in this regard. Additionally or alternatively, image encoder 104 and image decoder 106 may also be located in any cloud computing device 105, and the present disclosure is not limited in this regard.

Although the image reconstruction in the scenario of image transmission has been described above in conjunction with FIG. 1, it can be understood by a person skilled in the art that the method for image processing according to an embodiment of the present disclosure may not be limited to the scenario described above, but may also be applied as needed in any scenario where reconstruction of an image is required, and the present disclosure does not limit the application scenario. The method according to embodiments of the present disclosure effectively utilizes image information in the process of image reconstruction, and can thus greatly improve the resolution of the reconstructed image while reducing the amount of computation and related configuration resources and saving image processing time and network transmission bandwidth, and can also result in an image with higher resolution, thus greatly enhancing the viewing experience for the user.

The block diagram of example environment 100 in which embodiments of the present disclosure can be implemented has been described in the foregoing in conjunction with FIG. 1. A schematic diagram of image processing training system 200 for a method for image processing according to an embodiment of the present disclosure will be described below in conjunction with FIG. 2. Image processing training system 200 may be executed at computing devices 102 and 108 of the user in FIG. 1 and at any suitable computing device.

Figure 2:
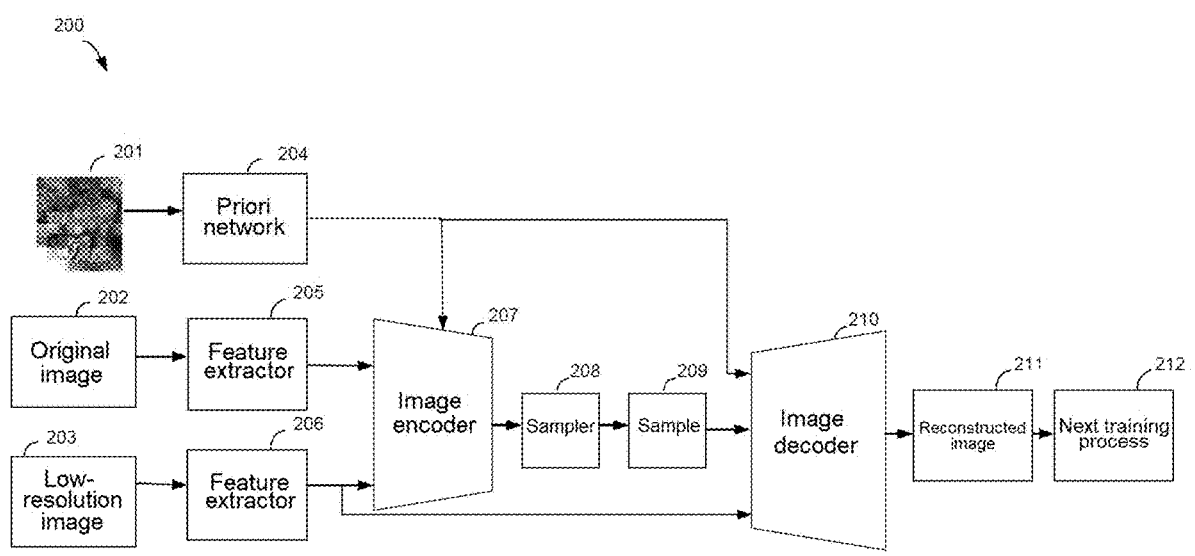
FIG. 2 illustrates a schematic diagram of an image processing training system according to an embodiment of the present disclosure.

As shown in FIG. 2, image processing training system 200 may include priori network 204, feature extractors 205 and 206, image encoder 207, sampler 208, and image decoder 210. It should be understood that the present disclosure does not limit the specific implementation of each element in image processing training system 200 and may employ a variety of known and future developed models or applications based on the needs of a processing task that needs to be implemented. Additionally or alternatively, image processing training system 200 may include more or fewer additional elements than the present disclosure, and a person skilled in the art may make a variety of modifications to image processing training system 200 without departing from the scope of the present disclosure as described in the claims.

In image processing training system 200, in response to a request for training of image encoder 207 and image decoder 210, image processing training system 200 may first perform extraction of image features of original image 202 and low-resolution image 203 by means of feature extractor 205 and feature extractor 206. Original image 202 and low-resolution image 203 may have the same image contents and image features, but their image resolutions may be different.

For example, original image 202 may be an image with 4k or 8k resolution, while low-resolution image 203 may be an image with the same image content and image features and with 720p or 1080p resolution. Additionally or alternatively, compared to original image 202, low-resolution image 203 may have different image content, image features, and resolution. Feature extractor 205 in the present disclosure may be any known and future developed model, and the present disclosure is not limited in this regard. As an example, feature extractor 205 in the present disclosure may be a VGG ("Oxford Visual Geometry Group")-19 model.

It should be understood that the method for image feature extraction in the present disclosure may employ a variety of known and future developed feature extraction methods based on the needs of a processing task that needs to be implemented, including but not limited to extraction of color or gray features of images, extraction of texture and edge features of images, image feature extraction based on deep neural networks, scale-invariant feature transform (SIFT) feature extraction, histogram of oriented gradient (HOG) feature extraction, and the like, and the present disclosure is not limited in this regard.

After receiving the request to train image encoder 207 and image decoder 210, image processing training system 200 may also perform image feature extraction on reference image 201 over priori network 204. Priori network 204 may be any trained deep neural network model, including but not limited to, a multi-layer perceptron (MLP), a recurrent neural network model, a recursive neural network model, a deep convolutional neural network (CNN) model, a deep generative model (DGM), a generative adversarial network (GAN) model, a variational autoencoder (VAE) model, and the like, and the present disclosure is not limited in this regard. As an example, priori network 204 in the present disclosure may be a three-layer 2D convolutional network model. Reference image 201 may be any image with multiple colors, edges, patterns, modes, and textures, and the present disclosure is not limited in this regard. By way of example, in the present disclosure, reference image 201 is a standard digital image widely used for quality measurements for image video codecs, and this reference image 201 contains a rich set of edges and patterns for reconstruction reference. Additionally or alternatively, reference image 201 may also be based on an arbitrary image specified by the user.

After feature extractors 205 and 206 extract features from original image 202 and low-resolution image 203, feature extractors 205 and 206 may transmit the extracted original image features and low-resolution image features to image encoder 207. Priori network 204 may transmit the extracted reference image features of the reference image to image encoder 207. Image encoder 207 may generate encoded data based on the received original image features, low-resolution image features, and reference image features.

Sampler 208 may then sample the encoded data to generate sample 209. It should be understood that the sampling method in the present disclosure may be any known and future developed sampling method, including but not limited to an image uniform sampling quantization method, an image non-uniform sampling quantization methods, and the like, and the present disclosure is not limited in this regard. As an example, in the present disclosure, sampler 208 may use a random Gaussian model to upsample an image hidden vector z from the encoded data containing the original image features to acquire sample 209, where the image hidden vector z is calculated as $\mu \in \mathbb{R}^{1 \times C}$ and $\sigma \in \mathbb{R}^{1 \times C}$, and the image hidden vector $z=\mu+\in *\sigma$, where μ denotes the mean of the sample data, σ denotes the variance of the sample data, and ∈ denotes a random parameter. The image hidden vector z in the upsampled original image features may then be used to process the conditional feature map for the reference image features of reference image 201, as shown in the following Equation (1):

$$F_{con} = \text{norm}(F) \times (1+\sigma_z) + \mu_z \tag{1}$$

where $F_{con}$ denotes the conditional feature map, F denotes the feature map of the reference image and $F \in \mathbb{R}^{M \times N \times C}$, where M×N denotes the size of the image and C denotes the number of channels of the image, norm denotes a normalization process to ensure that the feature map of the reference image has a mean of 0 and a variance of 1, and $\sigma_z$ and $\mu_z$ are the variance and mean of the upsampled hidden vector z.

In response to receiving sample 209, the reference image features, and the low-resolution image features, image decoder 210 may generate reconstructed image 211 based on the decoding of these data. Reconstructed image 211 may then be retransmitted to image encoder 207 for a next training process 212 of image encoder 207.

Before the next training process 212 of image encoder 207 begins, feature extractor 205 may first extract the reconstructed image features and transmit the reconstructed image features to image encoder 207. Subsequently, image encoder 207 may compare the reconstructed image features with the original image features.

Image processing training system 200 may stop training image encoder 207 in response to the reconstructed image features meeting a predetermined condition that is predefined by the user or the system. For example, in the case where the original image has 8K resolution, in response to reconstructed image 211 generated by image decoder 210 based on sample 209, the reference image features, and the low-resolution image features also having 8K resolution, image encoder 207 may determine that the reconstructed image features have met the predetermined condition and thus terminate the training of image encoder 207.

In another example, in the case where the original image also has 8K resolution, in response to reconstructed image 211 generated by image decoder 210 having only 4K, 2K, or lower resolution, image encoder 207 may determine that the reconstructed image features have not met the predetermined condition, and thus image processing training system 200 may continue to perform the training process described above on image encoder 207 and image decoder 210.

In yet another example, original image 202 may be an image having a plurality of details, edges, and textures, and in response to reconstructed image 211 generated by image decoder 210 having the same resolution of details, edges, and textures as original image 202, image encoder 207 may determine that the reconstructed image features have met the predetermined condition and thus terminate the training of image encoder 207. Conversely, in response to reconstructed image 211 generated by image decoder 210 restoring only 70%, 50%, or less of the details, edges, and textures in original image 202, image processing training system 200 may continue to perform the training process described above on image encoder 207 and image decoder 210.

In another example, the predetermined condition may also be that the peak signal-to-noise ratio (PSNR) of reconstructed image 211 reaches a predetermined threshold specified by the user. It should be understood that the predetermined conditions described above are examples only and are not a specific limitation of the present disclosure. The predetermined condition may be an arbitrary limitation to the reconstructed image features desired to be generated that is imposed by the user or the system according to the actual application, for example, reaching a predetermined resolution, being able to restore enough details of hair, edges, textures, etc., in the original image, having a sufficiently high PSNR, and so on, and the present disclosure is not limited in this regard.

According to the method for image processing of the present disclosure, the present disclosure allows upsampling of low-resolution images in real time on an edge computer without any additional expenditure on data storage. For computer vision, the techniques provided in the present disclosure may also be core components for any further processes such as object recognition and detection. The present disclosure may also be used in products such as metaverse and virtual reality and provide additional services. The super-resolution and large upsampling factor capabilities of the method for image processing according to the present disclosure can save a large amount of storage space and device costs while providing superior image recovery quality.

Figure 3:
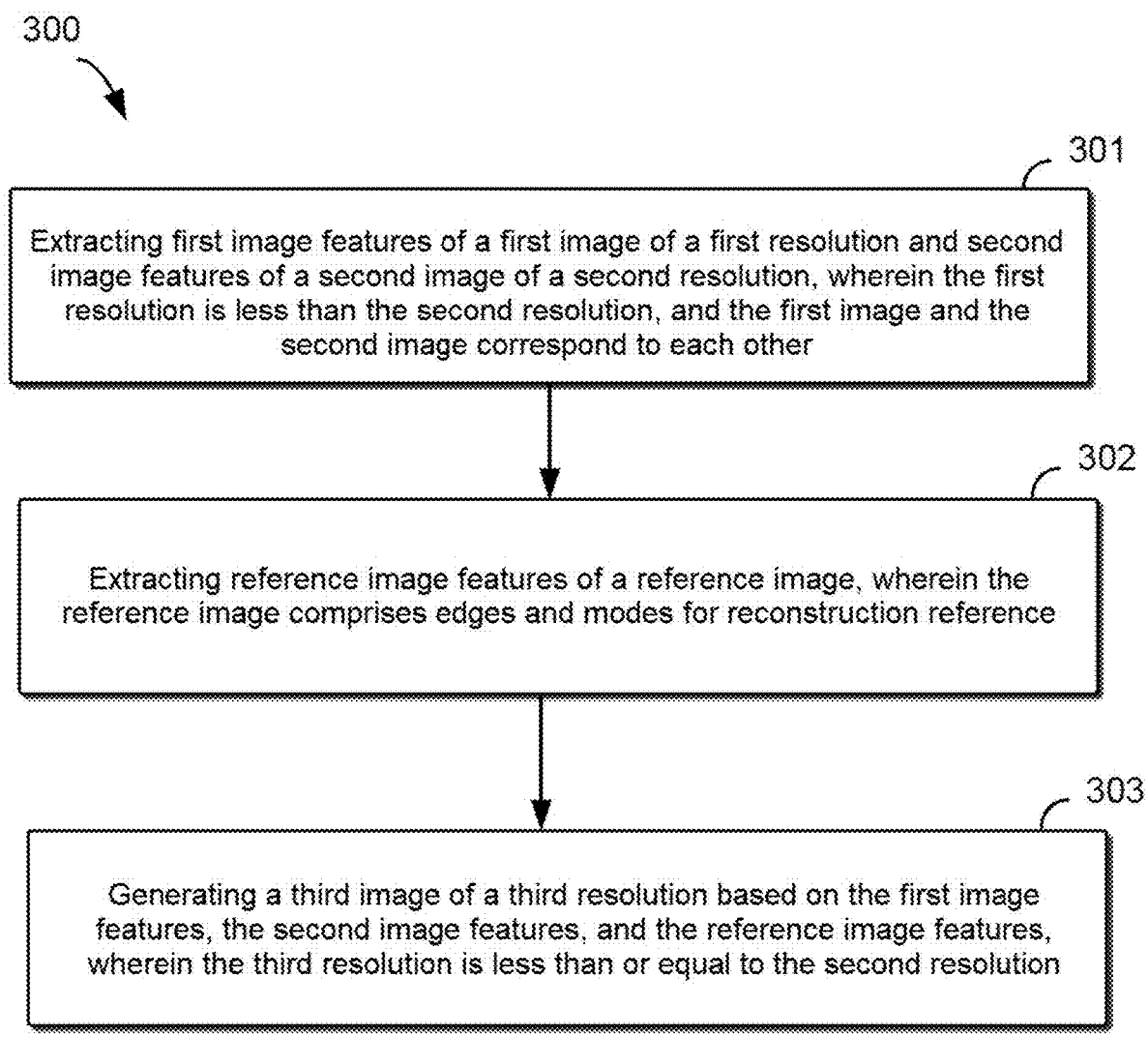
FIG. 3 illustrates a flow chart of a method for image processing according to an embodiment of the present disclosure.

A flow chart of method 300 for image processing according to an embodiment of the present disclosure will be described below in conjunction with FIG. 3.

At block 301, first image features of a first image of a first resolution and second image features of a second image of a second resolution are extracted, wherein the first resolution is less than the second resolution, and the first image and the second image correspond to each other. For example, image processing training system 200 of FIG. 2 may extract first image features of a first image having a first resolution and second image features of a second image having a second resolution via feature extractors 205 and 206, wherein the first image may be low-resolution image 203 and the second image may be original image 202, and wherein the first resolution is less than the second resolution, and the first image and the second image may correspond to each other in terms of image content, image features, and other aspects.

At block 302, reference image features of a reference image are extracted, wherein the reference image comprises edges and modes for reconstruction reference. For example, image processing training system 200 may extract reference image features of reference image 201 over priori network 204, wherein reference image 201 includes edges and patterns for reconstruction reference.

In some embodiments, image processing training system 200 extracting the reference image features of reference image 201 may include generating a feature map of reference image 201 over priori network 204; and extracting features of reference image 201 based on the feature map and high-frequency components of the reference image.

At block 303, a third image of a third resolution is generated based on the first image features, the second image features, and the reference image features, wherein the third resolution is less than or equal to the second resolution. For example, image processing training system 200 may generate, via image encoder 207, sampler 208, and image decoder 210, a third image of a third resolution based on the first image features, the second image features, and the reference image features, wherein the third resolution is less than or equal to the second resolution. In examples of the present disclosure, the third image may be reconstructed image 211, and the image resolution thereof may be less than or equal to that of original image 202.

In some embodiments, image processing training system 200 generating the third image having the third resolution includes generating first data by image encoder 207 based on encoding of the first image features, the second image features, and the reference image features. In examples of the present disclosure, the first data may be encoded data. The encoded data includes image features of reference image 201, image features of original image 202, and image features of the low-resolution image corresponding to the original image. These image features include, but are not limited to, color features, texture features, shape features, spatial relationship features, and the like. The color features further include, but are not limited to, image color distribution, the numbers of pixels of colors, high-frequency components and low frequency components in the image, and the like; the texture features include, but are not limited to, the gray distribution of pixels and their surrounding spatial neighborhoods, edges and hair details of objects in the image, and the like; and the spatial relationship features include, but are not limited to, the mutual spatial position or relative direction relationships between image objects, pixel position and orientation, and the like.

In some embodiments, image processing training system 200 generating the third image having the third resolution includes generating a plurality of samples by sampler 208 by upsampling the first data; and generating, in response to selecting a sample among the plurality of samples by the user or image processing training system 200, the third image by image decoder 210 based on decoding of the sample selected by the user or image processing training system 200, the first image features, and the reference image features.

In some embodiments, generating the plurality of samples may include upsampling a hidden vector in the first data by sampler 208 using a random Gaussian model.

In some embodiments, feature extractor 205 extracts third image features from the third image and transmits the third image features to image encoder 207. In response to the extracted third image features, image encoder 207 may compare the received third image features with the second image features. In examples of the present disclosure, the third image may be reconstructed image 211.

In some embodiments, in response to the third image features and the second image features not meeting a predetermined condition, image encoder 207 encodes the third image features, the reference image features, and the second image to generate second data, and upsamples and decodes the second data to generate a fourth image; and image encoder 207 stops encoding the third image features in response to the third image features and the second image features meeting the predetermined condition. In examples of the present disclosure, the second data may be another encoded data different from the first data, and the fourth image may be another reconstructed image different from the third image. The predetermined condition may be any condition associated with the image features that is specified by the user or image processing training system 200.

In some embodiments, image encoder 207 is trained by maximizing the difference between fourth image features of the fourth image and the second image features, and image decoder 210 is trained by minimizing the difference between the third image features of the third image and the second image features. The specific method of training will be described below in conjunction with FIG. 5.

In some embodiments, image encoder 207 and image decoder 210 are trained using an exponential function that is based on the second image and takes a natural constant e as the base.

In some embodiments, the user inputs low-resolution image 203 to the trained image encoder 207, and the trained image decoder 210 may generate reconstructed image 211 with higher resolution based on low-resolution image 203, where this reconstructed image 211 may have an image resolution that is at least similar to or the same as that of original image 202 and higher than that of low-resolution image 203.

Figure 4:
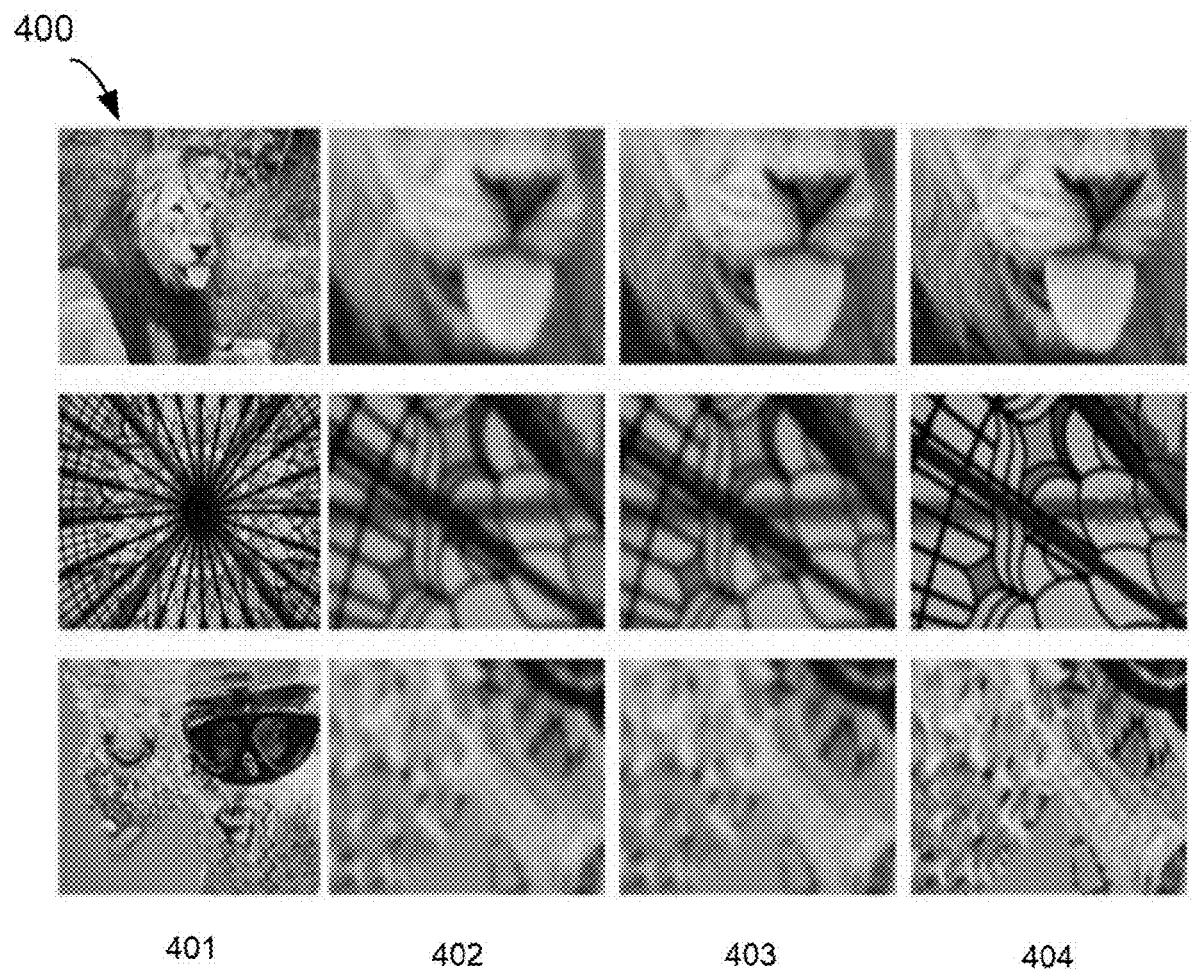
FIG. 4 illustrates a comparison diagram of images reconstructed respectively using a super-resolution VAE model, a super-resolution GAN model, and based on an encoder and a decoder of the present disclosure that are trained using a feature map and high-frequency components of a reference image.

FIG. 4 illustrates comparison diagram 400 of images reconstructed respectively using a super-resolution VAE model, a super-resolution GAN model, and based on an encoder and a decoder of the present disclosure that are trained using a feature map and high-frequency components of a reference image.

From left to right, FIG. 4 illustrates in sequence a set of original images 401, portion 402 of a set of images reconstructed using a super-resolution VAE (SRVAE) model, portion 403 of a set of images reconstructed using a super-resolution GAN (SRGAN) model, and portion 404 of a set of images reconstructed based on the encoder and the decoder of the present disclosure that are trained using the feature map and high-frequency components of the reference image, respectively.

By comparison, it can be found that compared with portion 402 of the images reconstructed using the super-resolution VAE model and portion 403 of the images reconstructed using the super-resolution GAN model, portion 404 of the set of images reconstructed based on the encoder and the decoder of the present disclosure that are trained using the feature map and high-frequency components of the reference image can have clearer details such as edges, patterns, textures, hair, etc.; and the reconstructed set of images 404 have a higher PSNR of 31.4, while the images reconstructed using the super-resolution VAE model and using the super-resolution GAN model have a PSNR of 30.12 and 30.45, respectively. This is because in the process of image training of conventional neural network models, the neural network models usually focus on learning of low-frequency components of the images, such as the overall outline of the images, the background image, etc., during the iterative training process, but neglect learning of high-frequency components of the images, such as hair, textures, and edges in the images, such that the obtained images are usually more blurred in details compared with the original images.

In the present disclosure, in order to enable priori network 204 to extract high-frequency components from reference image 201, image processing training system 200 of the present disclosure may encode the conditional feature map $F_{con}$ containing the feature map of the reference image as described above by means of position encoding. The basic process is to expand the feature map using a trigonometric function, which is illustratively expressed as shown in the following Equation (2):

$$\lambda(o) = (\sin(2^0\pi o), \cos(2^0\pi o), \ldots, \sin(2^{L-1}\pi o), \cos(2^{L-1}\pi o)) \quad (2)$$

where L denotes the level of expansion, and o denotes the coordinates of each point in the reference image.

By calculating L pairs of trigonometric functions for the input coordinates o, the time domain of the input o can thus be expanded into the frequency domain, and the high-frequency components in the reference image are ultimately retained. Image processing training system 200 may combine the low-resolution image feature map $T \in \mathbb{R}^{M \times N \times C}$ and the conditional feature map $F_{con}$ into $\lambda(o) \odot T \| F_{con}$ and input this data into image decoder 210 for image reconstruction.

Figure 5:
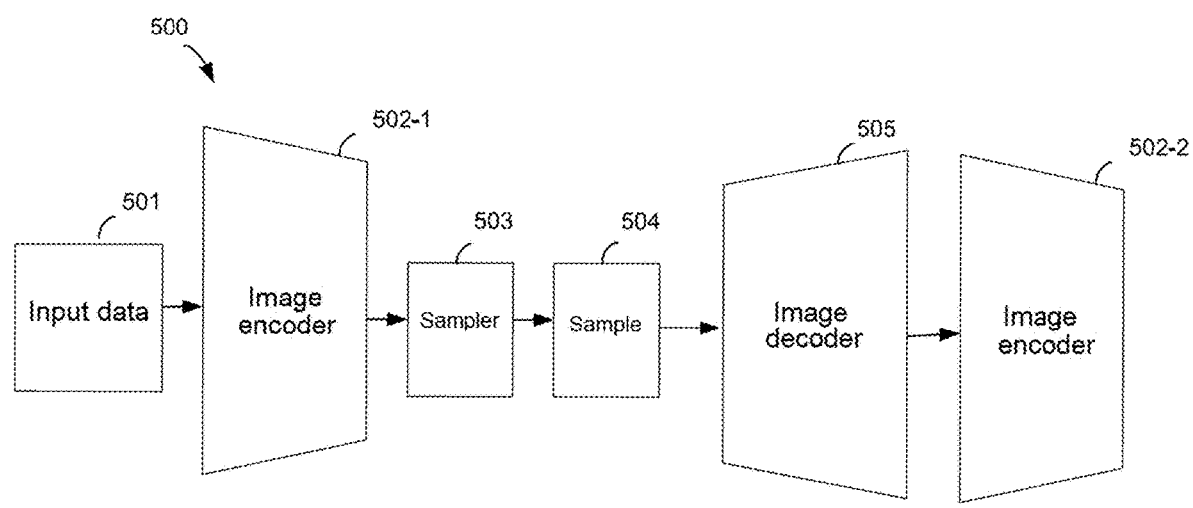
FIG. 5 illustrates a schematic diagram of a training process for an encoder and a decoder of an image processing system according to an embodiment of the present disclosure.

FIG. 5 illustrates a schematic diagram of training process 500 for an encoder and a decoder of an image processing system for a method for image processing according to an embodiment of the present disclosure.

In the process of training the encoder and decoder in the variational autoencoder (VAE) model, the metric for the reconstructed image may be illustratively expressed as shown in the following Equation (3):

$$L^{ELBO} = \mathbb{E}_{z \sim Q(z|x)}[\log P_\theta(x|z)] - D_{KL}[Q_\phi(z|x) \| P(z)] \leq \log P_\theta(x) \quad (3)$$

where the input data is $x \in X$, the encoder is denoted as Q having a learnable parameter $\phi$, the decoder is denoted as P having a learnable parameter $\theta$, and z denotes the hidden vector in the image. The purpose of this training is to maximize the evidence lower bound (ELBO) of the likelihood of the reconstructed image data. During the training process, for the given hidden vector, preferred reconstructed sample data is generated by optimizing the decoder; at the same time, the Kullback-Leibler (KL) divergence is used to constrain the encoder to make the approximate posterior distribution Q (z|x) match the prior distribution P(Z). The KL term may be coupled with the adversarial loss.

Equation (3) above may be used in two scenarios where: (1) for the generated sample $D_\theta(x|z)$, $KL(E_\phi(D_\theta(z)) \| P(z))$ may be expected to be maximized, and (2) for the true sample x, the KL term is expected to be minimized as $KL(E_\phi(x \| P(z)))$. Thus, an introspective variational autoencoder (IntroVAE) can be introduced to form a generative adversarial network (GAN)-style structure, where the decoder is similar to the generator in the GAN, and the encoder is similar to the discriminator in the GAN. The training process in this model may be further divided into: (1) firstly, optimizing the encoder by keeping the decoder unchanged, and (2) secondly, optimizing the decoder by keeping the encoder unchanged, and the process can be illustratively expressed as shown in the following Equation (4):

$$L_{E_\phi}(x,z) = ELBO(x) - \max\{0, m - KL[E_{phi}(D_\theta(z)) \| P(z)]\}$$

$$L_{D_\theta}(x,z) = ELBO(x) - KL[E_{phi}(D_\theta(z)) \| P(z)]$$

where $\mathbb{E}_{z \sim E(z|x)}[\log D_\theta(x|z)] - KL[E_\phi(z|x) \| P(z)]$ \quad (4)

and where the encoder is denoted as E, while the decoder is denoted as D, and phi denotes the correlation between variables. Fixing the threshold in this model may lead to instability in training and difficulty in analyzing the complete optimization object. Therefore, Equation (4) may be rewritten in the present disclosure as Equation (5) as follows:

$$L_{E_\phi}(x, z) = ELBO(x) - \frac{1}{\alpha}\exp(\alpha ELBO(D_\theta(z))) \quad (5)$$

$$L_{D_\theta}(x, z) = ELBO(x) + \gamma ELBO(D_\theta(z))$$

where $\alpha \geq 0$ and $\gamma \geq 0$, and they denote hyperparameters. In contrast to Equation (4), for the adversarial loss, the present disclosure uses the ELBO term to replace the KL term, and uses an exponential function $$\frac{1}{\alpha}\exp(\alpha ELBO(D_\theta(z)))$$

that is based on the original image and takes a natural constant e as the base to replace the fixed threshold.

Ultimately, the training process for the image encoder and image decoder in the present disclosure can be turned into an adversarial process between the encoder and the decoder. As shown in FIG. 5, in training process 500 for the encoder and the decoder of an image processing system for the method for image processing, image encoder 502-1 can be trained by first fixing image decoder 505. In this process, input data 501 containing original image 202, low-resolution image 203, and reference image 201 may be first input to image encoder 502-1 for encoding, and the encoded data may then be upsampled via sampler 503 to generate sample 504. Sample 504 may be input to image decoder 505 for generating a reconstructed image. The reconstructed image is then input to image encoder 502-2, and image encoder 502-2 compares the received reconstructed image with the original image to determine whether the reconstructed image meets a predetermined condition. Additionally or alternatively, image encoder 502-1 and image decoder 502-2 may be the same or different image encoders, and the present disclosure is not limited in this regard. According to Equation (5), in the process of training image encoder 502-1 or 502-2, image processing training system 200 trains image encoder 502-1 or 502-2 by maximizing the difference between the reconstructed image features of the reconstructed image generated by image decoder 505 and the original image features, so that image encoder 502-1 or 502-2 can be improved in its ability to discriminate the reconstructed images.

On the other hand, according to Equation (5), in the process of training image decoder 505, image processing training system 200 causes the image generated by image decoder 505 to be as similar as possible to the original image by minimizing the difference between the reconstructed image features of the reconstructed image generated by image decoder 505 and the original image features. The training processes for image encoder 502-1 or 502-2 and image decoder 505 eventually become a game between image encoder 502-1 or 502-2 and image decoder 505, where image encoder 502-1 or 502-2 can distinguish the original image from the reconstructed image based on the ELBO value, while image decoder 505 may try to "cheat" image encoder 502-1 or 502-2 by generating the reconstructed image, and the two training processes are performed iteratively. This ultimately improves the ability of image encoder 502-1 or 502-2 to discriminate the reconstructed image and the ability of image decoder 505 to generate a reconstructed image that is as similar as possible to the original image.

During the training process, image processing training system 200 may also use methods such as translation and rotation to randomly enhance the training of an image. For reference image 201, image processing training system 200 may divide the reference image into 256 image blocks with a size of 16×16 and stack these image blocks into a 3D cube for training, and may also randomly rotate and flip these image blocks.

Figure 6:
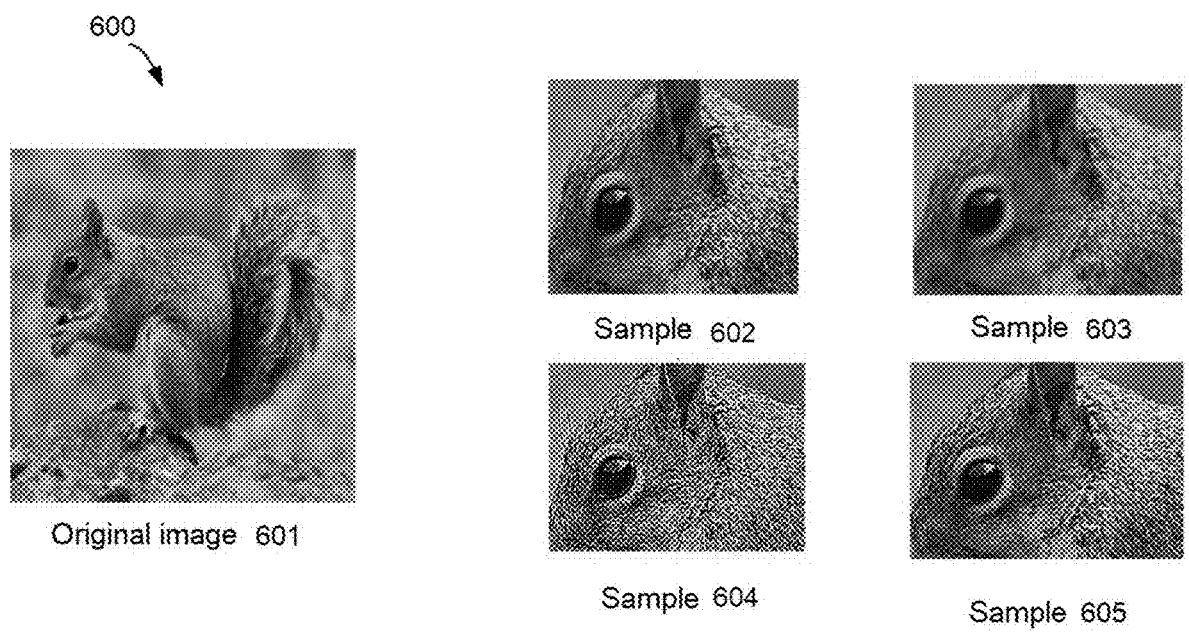
FIG. 6 illustrates a schematic diagram of a process for generating a plurality of samples by upsampling image data according to an embodiment of the present disclosure.

FIG. 6 illustrates a schematic diagram of process 600 for generating a plurality of samples by upsampling image data for a method for image processing according to an embodiment of the present disclosure.

During training, image processing training system 200 may generate, with respect to original image 601, image samples (e.g., image samples 602, 603, 604 and 605) with different features, where these features may include, but are not limited to, the resolution, the size, edge details, etc. of the images. The user may select one of the plurality of image samples 602 to 605 based on the user preference and cause image processing training system 200 to train the image encoders and image decoder based on the selected sample, so that the trained image encoders and image decoder can generate a high-resolution image desired by the user based on the low-resolution image after being input with the low-resolution image.

Figure 7:
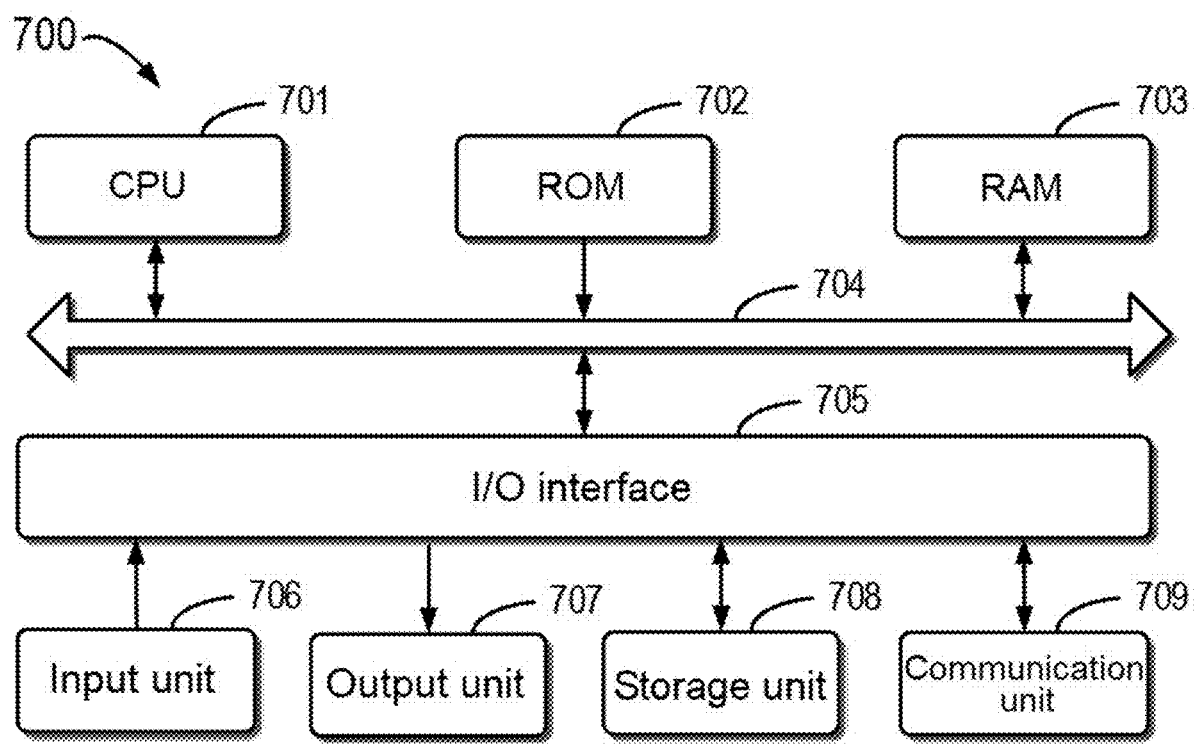
FIG. 7 illustrates a block diagram of an example device suitable for implementing embodiments of the present disclosure.

FIG. 7 illustrates a block diagram of example device 700 that can be used to implement embodiments of the present disclosure. Computing devices 102 and 108 in FIG. 1 may be implemented using device 700. As shown in the figure, device 700 includes central processing unit (CPU) 701 that may perform various appropriate actions and processing according to computer program instructions stored in read-only memory (ROM) 702 or computer program instructions loaded from storage unit 708 to random access memory (RAM) 703. Various programs and data required for the operation of device 700 may also be stored in RAM 703. CPU 701, ROM 702, and RAM 703 are connected to each other through bus 704. Input/Output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices over a computer network, such as the Internet, and/or various telecommunication networks.

The various methods and processes described above, such as method 300, may be performed by CPU 701. For example, in some embodiments, method 300 may be implemented as a computer software program that is tangibly included in a machine-readable medium such as storage unit 708. In some embodiments, part or all of the computer programs may be loaded and/or installed onto device 700 via ROM 702 and/or communication unit 709. When the computer program is loaded into RAM 703 and executed by CPU 701, one or more steps of method 300 described above can be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on the involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated improvements, so as to enable persons of ordinary skill in the art to understand the embodiments disclosed herein.

What is claimed is:

1. A method for image processing, comprising:
   extracting first image features of a first image of a first resolution and second image features of a second image of a second resolution, wherein the first resolution is less than the second resolution, and the first image and the second image correspond to each other;
   extracting reference image features of a reference image, wherein the reference image comprises edges and modes for reconstruction reference; and
   generating a third image of a third resolution based on the first image features, the second image features, and the reference image features, wherein the third resolution is less than or equal to the second resolution;
   wherein the first image features, the second image features, and the reference image features are applied to respective inputs of an encoder;
   wherein an output of the encoder is processed to provide at least one sample generated based on the first image features, the second image features, and the reference image features;
   wherein the at least one sample, the first image features, and the reference image features are applied to respective inputs of a decoder; and
   wherein an output of the decoder provides the third image.

2. The method according to claim 1, wherein extracting the reference image features of the reference image comprises:
   generating a feature map of the reference image; and
   extracting the reference image features based on the feature map and high-frequency components of the reference image.

3. The method according to claim 1, wherein generating the third image of the third resolution comprises:
   generating first data by the encoder based on encoding of the first image features, the second image features, and the reference image features.

4. The method according to claim 3, wherein generating the third image of the third resolution further comprises:
   generating a plurality of samples by upsampling the first data; and
   generating, in response to selecting a sample among the plurality of samples, the third image by the decoder based on decoding of the selected sample, the first image features, and the reference image features.

5. The method according to claim 4, further comprising:
   extracting third image features of the third image; and
   comparing the third image features with the second image features.

6. The method according to claim 5, wherein comparing the third image features with the second image features comprises:
   encoding, in response to the third image features and the second image features not meeting a predetermined condition, the third image features, the reference image features, and the second image to generate second data, and upsampling and decoding the second data to generate a fourth image; and terminating encoding of the third image features in response to the third image features and the second image features meeting the predetermined condition.

7. The method according to claim 6, wherein the encoder is trained by maximizing the difference between fourth image features of the fourth image and the second image features, and the decoder is trained by minimizing the difference between the third image features of the third image and the second image features.

8. The method according to claim 7, further comprising: generating, based on an input image, an output image corresponding to the input image using the trained encoder and the trained decoder, wherein the output image has a resolution greater than that of the input image.

9. The method according to claim 6, wherein the encoder and the decoder are trained using an exponential function that is based on the second image and takes a natural constant e as the base.

10. The method according to claim 4, wherein generating the plurality of samples comprises:
upsampling a hidden vector in the first data using a random Gaussian model.

11. An electronic device, comprising:
at least one processor; and
memory coupled to the at least one processor and having instructions stored therein, wherein the instructions, when executed by the at least one processor, cause the electronic device to perform actions comprising:
extracting first image features of a first image of a first resolution and second image features of a second image of a second resolution, wherein the first resolution is less than the second resolution, and the first image and the second image correspond to each other;
extracting reference image features of a reference image, wherein the reference image comprises edges and modes for reconstruction reference; and
generating a third image of a third resolution based on the first image features, the second image features, and the reference image features, wherein the third resolution is less than or equal to the second resolution;
wherein the first image features, the second image features, and the reference image features are applied to respective inputs of an encoder;
wherein an output of the encoder is processed to provide at least one sample generated based on the first image features, the second image features, and the reference image features;
wherein the at least one sample, the first image features, and the reference image features are applied to respective inputs of a decoder; and
wherein an output of the decoder provides the third image.

12. The electronic device according to claim 11, wherein extracting the reference image features of the reference image comprises:
generating a feature map of the reference image; and
extracting the reference image features based on the feature map and high-frequency components of the reference image.

13. The electronic device according to claim 11, wherein generating the third image of the third resolution comprises:
generating first data by the encoder based on encoding of the first image features, the second image features, and the reference image features.

14. The electronic device according to claim 13, wherein generating the third image of the third resolution further comprises:

generating a plurality of samples by upsampling the first data; and
generating, in response to selecting a sample among the plurality of samples, the third image by the decoder based on decoding of the selected sample, the first image features, and the reference image features.

15. The electronic device according to claim 14, the actions further comprising:
extracting third image features of the third image; and
comparing the third image features with the second image features.

16. The electronic device according to claim 15, wherein comparing the third image features with the second image features comprises:
encoding, in response to the third image features and the second image features not meeting a predetermined condition, the third image features, the reference image features, and the second image to generate second data, and upsampling and decoding the second data to generate a fourth image; and
terminating encoding of the third image features in response to the third image features and the second image features meeting the predetermined condition.

17. The electronic device according to claim 16, wherein the encoder is trained by maximizing the difference between fourth image features of the fourth image and the second image features, and the decoder is trained by minimizing the difference between the third image features of the third image and the second image features.

18. The electronic device according to claim 16, wherein the encoder and the decoder are trained using an exponential function that is based on the second image and takes a natural constant e as the base.

19. The electronic device according to claim 14, wherein generating the plurality of samples comprises:
upsampling a hidden vector in the first data using a random Gaussian model.

20. A computer program product tangibly stored on a non-transitory computer-readable medium and comprising machine-executable instructions, wherein the machine-executable instructions, when executed by a machine, cause the machine to perform actions comprising:
extracting first image features of a first image of a first resolution and second image features of a second image of a second resolution, wherein the first resolution is less than the second resolution, and the first image and the second image correspond to each other;
extracting reference image features of a reference image, wherein the reference image comprises edges and modes for reconstruction reference; and
generating a third image of a third resolution based on the first image features, the second image features, and the reference image features, wherein the third resolution is less than or equal to the second resolution;
wherein the first image features, the second image features, and the reference image features are applied to respective inputs of an encoder;
wherein an output of the encoder is processed to provide at least one sample generated based on the first image features, the second image features, and the reference image features;
wherein the at least one sample, the first image features, and the reference image features are applied to respective inputs of a decoder; and
wherein an output of the decoder provides the third image.

* * * * *